O. P. WOODBURN.
THRUST BEARING.
APPLICATION FILED JUNE 8, 1918.

1,297,769.

Patented Mar. 18, 1919.

WITNESS
George Symnestvedt

INVENTOR
Orrus P. Woodburn
by
Symnestvedt Busby Lehner Fords
ATTORNEY

UNITED STATES PATENT OFFICE.

OSCAR P. WOODBURN, OF MEMPHIS, TENNESSEE, ASSIGNOR TO LAYNE & BOWLER COMPANY, OF MEMPHIS, TENNESSEE, A CORPORATION OF TEXAS.

THRUST-BEARING.

1,297,769.  Specification of Letters Patent.  Patented Mar. 18, 1919.

Application filed June 8, 1918. Serial No. 238,974.

*To all whom it may concern:*

Be it known that I, OSCAR P. WOODBURN, a citizen of the United States, residing at Memphis, in the county of Shelby and State of Tenn., have invented new and useful Improvements in Thrust-Bearings, of which the following is a specification.

My invention relates to apparatus for receiving thrust loads, and has particular reference to a means for distributing the load among a plurality of bearings. It has for its primary object the provision of means of the character described which comprises a main supporting frame, individual supporting members for each bearing movable with respect to the frame, and a cable or other flexible means coöperating with the frame and the supporting members in such manner as to distribute the load among the bearings as will hereinafter more clearly appear. I attain this object by means of a construction illustrated in preferred form in the accompanaying drawing wherein—

Figure 1:
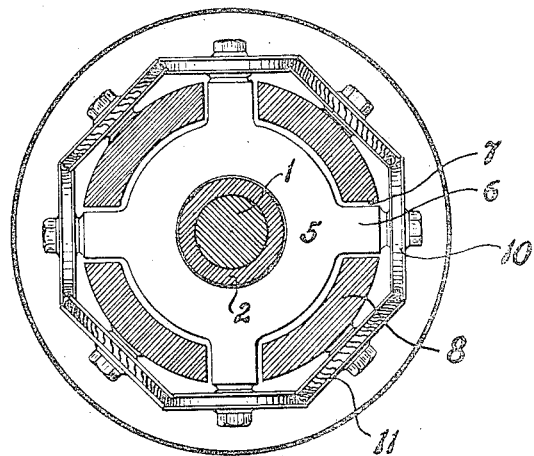
Figure 2:
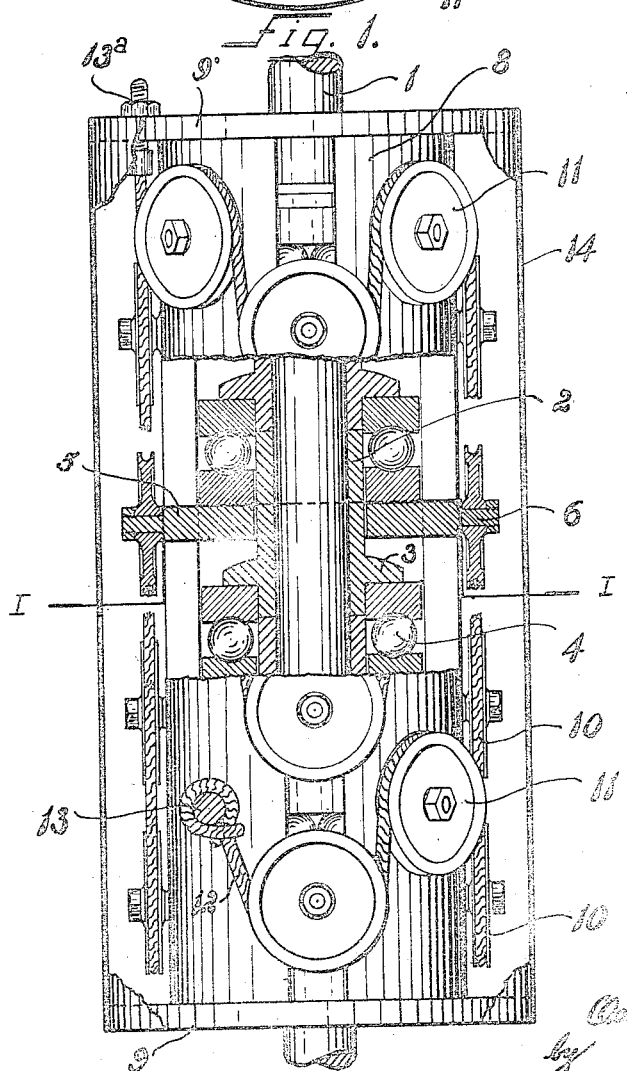

Figure 1 is a section on the line I—I of Fig. 2 and Fig. 2 is a side elevation of the device partly in section.

To a vertical shaft 1, which carries the load, are fastened the sleeves 2 having the bearing shoulders 3. These shoulders abut against suitable bearings 4 there being provided two or more as desired. Below each bearing is a bearing plate 5 upon which the bearing is supported. Extensions 6 on the plates 5 project through slots 7 extending the length of a frame 8, which frame incloses the bearings. The plates 5 are adapted to move vertically in the frame and are guided by the extensions 6 in the slots 7. The frame 8 is provided at the bottom with a flange 9 which is adapted to rest upon any suitable support, and at the top with a flange 9'.

On the extensions 6 of the plates 5 are mounted sheaves 10 and on the frame 8 are mounted other sheaves 11. The sheaves on the frame are arranged in sets circumferentially thereof, the number of sheaves in a set being the same as the number on a plate. The sets of sheaves on the plates are arranged to come between the sets on the frame, and the sheaves of one set are arranged in staggered relation to the sheaves of the other set, as shown. A cable 12 is fastened to a pin 13 on the frame and is then passed below a sheave on one of the extensions of the bottom plate 5. It is then passed up and over a sheave on the frame, the same being one of the set immediately above the bottom plate and located between the first and second sheaves of the plate. Next it is passed below the second sheave of the plate and then up and over the second sheave on the frame. This process is continued until the cable has been threaded around all of the sheaves. The other end is now fastened adjustably to the frame as indicated at 13ª. It is, therefore, apparent that the plates 5 and the bearings which they support are carried on the cable 12 and that by means of this cable and the arrangement of sheaves around which it is threaded the thrust load is readily distributed among all the bearings.

Surrounding the whole apparatus there may be placed a sheet metal or other protective covering 14 which may also be used as an oil reservoir, so that all moving parts run in a bath of oil.

I claim:

1. In an apparatus for receiving thrust loads having a rotating shaft and a plurality of bearings therefor, the combination of a movable support for each bearing, a frame coöperating therewith and flexible means fixed to the frame and adapted to yieldingly carry the movable supports for the bearings whereby the load is distributed among all the bearings.

2. An apparatus for receiving thrust loads comprising in combination a frame, a rotating shaft, a plurality of bearings for the shaft, and movable supporting members for the bearings, said members and their bearings being yieldingly supported by a cable on the frame in such maner as to distribute the load among the bearings.

3. An apparatus for receiving thrust loads comprising in combination a frame, a rotating shaft, a plurality of bearings for the shaft, movable supporting members for the bearings, a plurality of supporting points on the frame, and flexible means for carrying the supporting members, said flexible means extending alternately from a supporting point on the frame to a point on a supporting member, whereby the load is distributed among the bearings.

4. An apparatus for receiving thrust loads, comprising in combination a frame, a rotating shaft, a plurality of bearings for the shaft, movable supporting members for the bearings, a plurality of supporting points on the frame, and a cable for carrying the supporting members yieldingly threaded between the supporting points on the frame and said supporting members, whereby the load is distributed among the bearings.

5. In a thrust bearing having a shaft and a plurality of bearings therefor, equalizing means comprising in combination a frame, sheaves on the frame arranged in sets longitudinally thereof, a bearing plate beneath each bearing adapted to move longitudinally of the frame, a set of sheaves on each plate corresponding in number to those on the frame, the sets on the plates being arranged in alternate relation with those on the frame, and a cable alternately threaded from a sheave of one set to a sheave of the other set and having its ends fastened to the frame, substantially as and for the purpose set forth.

In testimony whereof I have hereunto signed my name.

OSCAR P. WOODBURN.